(12) United States Patent
Chan

(10) Patent No.: US 11,488,315 B2
(45) Date of Patent: Nov. 1, 2022

(54) VISUAL AND GEOLOCATION ANALYTIC SYSTEM AND METHOD

(71) Applicant: SagaDigits Limited, Hong Kong (HK)

(72) Inventor: Chi Chuen Chan, Hong Kong (HK)

( * ) Notice: Subject to any disclaimer, the term of this patent is extended or adjusted under 35 U.S.C. 154(b) by 870 days.

(21) Appl. No.: 16/256,188

(22) Filed: Jan. 24, 2019

(65) Prior Publication Data

US 2019/0236793 A1    Aug. 1, 2019

Related U.S. Application Data

(60) Provisional application No. 62/622,145, filed on Jan. 26, 2018.

(51) Int. Cl.

| | | |
|---|---|---|
| G06T 9/00 | (2006.01) |
| G06T 7/292 | (2017.01) |
| G06T 7/246 | (2017.01) |
| G06K 9/62 | (2022.01) |
| G06Q 30/02 | (2012.01) |
| G06Q 10/08 | (2012.01) |
| G06V 20/52 | (2022.01) |
| G06V 40/16 | (2022.01) |

(52) U.S. Cl.
CPC ............ *G06T 7/292* (2017.01); *G06K 9/6288* (2013.01); *G06Q 10/087* (2013.01); *G06Q 30/0201* (2013.01); *G06T 7/251* (2017.01); *G06V 20/52* (2022.01); *G06V 40/172* (2022.01); *G06T 2207/20081* (2013.01); *G06T 2207/20084* (2013.01); *G06T 2207/30201* (2013.01); *G06T 2210/12* (2013.01); *G06V 2201/07* (2022.01); *G06V 2201/10* (2022.01)

(58) Field of Classification Search
CPC ..................... G06T 7/292; G06T 7/251; G06T 2207/20081; G06T 2207/20084; G06T 2207/30201; G06T 2210/12; G06T 7/20; G06T 2207/30196; G06T 2207/30232; G06T 2207/30241; G06K 9/00288; G06K 9/00771; G06K 9/6288; G06K 2209/21; G06K 2209/27; G06Q 10/087; G06Q 30/0201
USPC .......................................................... 382/103
See application file for complete search history.

(56) References Cited

U.S. PATENT DOCUMENTS

| | | | | |
|---|---|---|---|---|
| 8,520,906 B1* | 8/2013 | Moon | .................. | G06K 9/6292 |
| | | | | 382/118 |
| 2006/0244588 A1* | 11/2006 | Hannah | ................ | G01C 21/206 |
| | | | | 340/539.13 |
| 2007/0263093 A1* | 11/2007 | Acree | .................. | H04N 5/2628 |
| | | | | 348/207.99 |
| 2014/0347475 A1* | 11/2014 | Divakaran | ......... | G06K 9/00771 |
| | | | | 348/135 |

(Continued)

*Primary Examiner* — Stephen P Coleman

(57) ABSTRACT

A visual and geolocation analytic system is provided, including: an analytic device and a number of image capturing devices connected to said analytic device. The image capturing devices capture images of an object at a time interval and send said captured images to said analytic device; said analytic device comprises a deep learning model for analyzing said captured images, allowing said object to be identified and tagged, and allowing a path of movement of said object across time to be tracked. The present invention tracks the position of an object within an area continuously across time, and transform the object in captured images into structured data set for analysis.

15 Claims, 3 Drawing Sheets

(56) References Cited

U.S. PATENT DOCUMENTS

| | | | |
|---|---|---|---|
| 2016/0189500 A1* | 6/2016 | Kim | G08B 13/19645 |
| | | | 386/223 |
| 2017/0286773 A1* | 10/2017 | Skaff | G06N 20/00 |
| 2017/0364733 A1* | 12/2017 | Estrada | G06N 3/0454 |
| 2018/0034715 A1* | 2/2018 | Nagaraju | H04L 43/08 |
| 2018/0046975 A1* | 2/2018 | Jones | G06Q 10/087 |

* cited by examiner

VISUAL AND GEOLOCATION ANALYTIC SYSTEM AND METHOD

CROSS REFERENCE TO RELATED APPLICATIONS

The present application claims priority from US provisional application 62/622,145 filed on 26 Jan. 2018, the entirety of which is incorporated herein by reference.

FIELD OF INVENTION

The present application is related to a visual and geolocation analytic system, and in particular a visual and geolocation analytic system using edge computing technology.

BACKGROUND OF INVENTION

In the information driven society today, any kind of information can be valuable. For example, for a retail store, customer information such as foot traffic or consumer demographics is very important for the owners to provide the best experience and products to customers. Currently some of the researches are done manually, and hence is costly, time consuming, ineffective and inconsistent to provide useful insights.

SUMMARY OF INVENTION

In forelight of the background, an advanced visual and geolocation analytic system is needed for more efficient and convenient analysis. A key feature is to transform an object in captured images into structured data set for analysis. Data can be collected locally and synchronized with other devices.

In one embodiment of the present invention, a visual and geolocation analytic system is provided, including: an analytic device and a number of image capturing devices connected to said analytic device. The image capturing devices capture images of an object at a time interval and send said captured images to said analytic device; said analytic device comprises a deep learning model for analyzing said captured images, allowing said object to be identified and tagged, and allowing a path of movement of said object across time to be tracked.

In a preferred embodiment, deep learning model of said analytic device comprises a facial recognition system for recognizing a person. In a further embodiment, the facial recognition system further determines demographic information of said person. In another preferred embodiment, the deep learning model of said analytic device comprises an object detection system for recognizing a stock keeping unit of a product item.

In a preferred embodiment, deep learning model is trained with image classification using convolutional neural networks and fine tuned with bounding boxes and image distortions, so that it is capable of object detection by recognizing distinct attributes within images and to tag positional information on said object.

In a preferred embodiment, the system further comprises a transaction device linked to said analytic device, wherein said transaction device sends a transaction record involving said object to said analytic device, said analytic device integrates said transaction record into said path of movement of said object.

In a preferred embodiment, the system further comprises at least one weight sensor linked to said analytic device, wherein said weight sensor sends a signal to said analytic device when a weight change is detected at a sensed location.

In a preferred embodiment, the captured images are discarded from said analytic device after analyzing, and only a structured data set containing an identity and said path of movement of said object across time is retained. In a preferred embodiment, the analytic device is synchronized with analytic devices of other systems to form a distributed edge network.

In another aspect of the invention, a method for visual and geolocation analysis is provided. The method comprises the steps of: capturing images of an object at a time interval with a number of image capturing devices; recognizing and tagging said object from said captured images by an analytic device having a deep learning model; extracting time and location data of said object from said captured images, and tracking a path of movement of said object across time.

The present invention provides significant advantages over existing systems. For example, the present invention tracks the position of a person within an area continuously across time. The path of movement of the person is tracked and any product items that the person has purchased is also tracked. The statistics can be analyzed and layout of the area or the product lineup can be optimized. Demographic information of the person can also be determined, and targeted information can be provided to the person when the person is within or proximate the area.

DETAILED DESCRIPTION OF INVENTION

Figure 1:
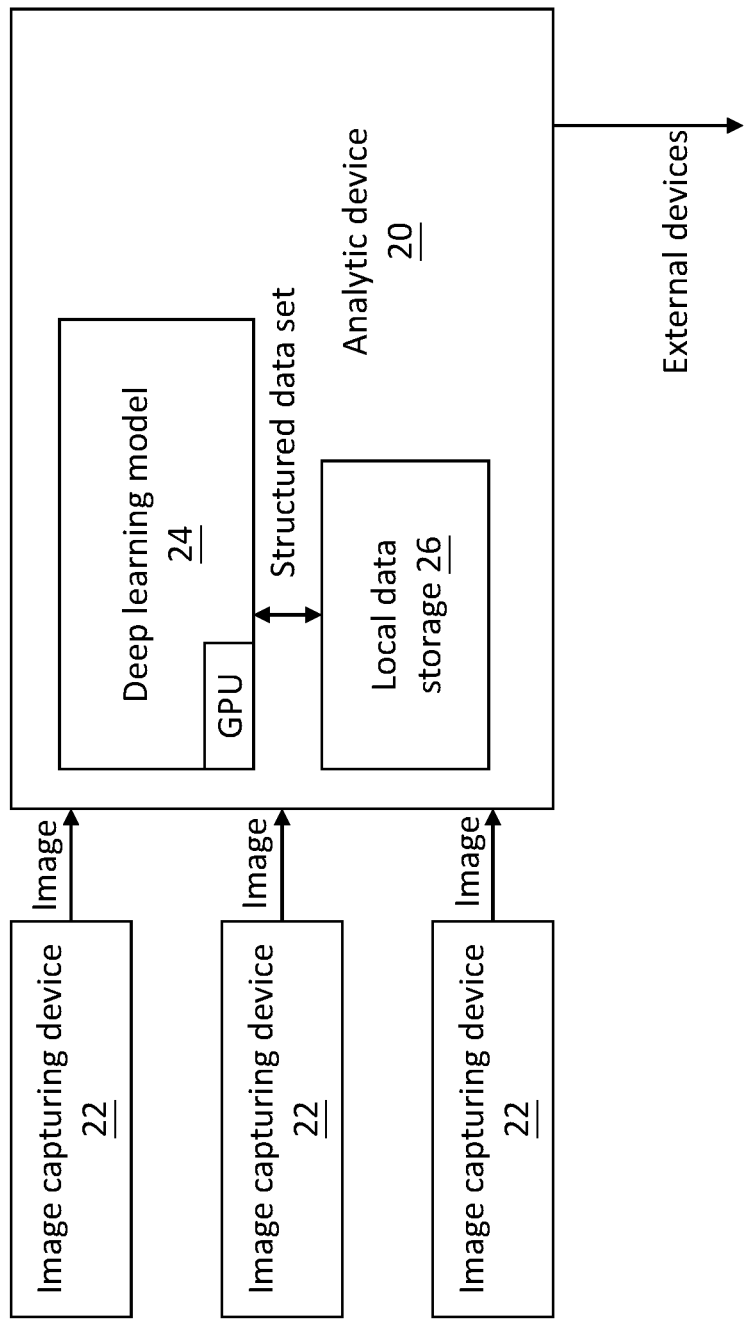
FIG. 1 is a block diagram of a visual and geolocation tracking system according to an embodiment of the present invention.

FIG. 1 shows a first embodiment of the present invention. The invention comprises an analytic device 20, and a number of image capturing devices 22 connected to the analytic device 20. The analytic device 20 comprises a deep learning model 24 having a graphics processor unit, and a local data storage 26. The analytic device 20 also comprises communication means such as wired or wireless communication modules for connecting to external devices.

Figure 2:
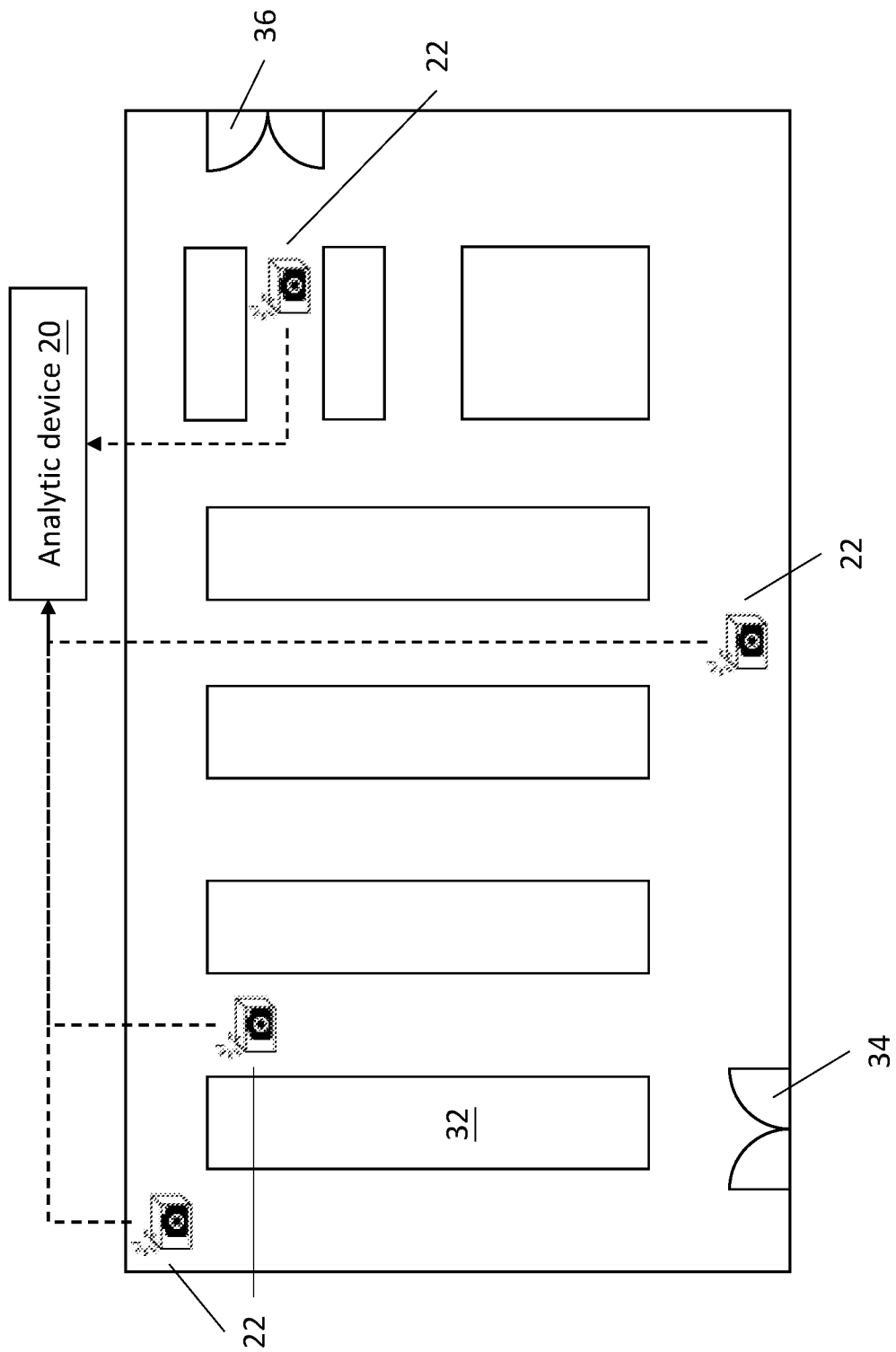
FIG. 2 shows an example setting of using the visual and geolocation tracking system of the present invention.

In an example setting as shown in FIG. 2, said image capturing devices 22 are installed at fixed locations of a predetermined area, such as exits 36 and entrances 34, corners or along a path, or locations of importance such as product shelf 32. Preferably, the image capturing devices 22 are installed to cover a continuous area, and more preferably at least two image capturing devices 22 simultaneously cover an area at different angles for more accurate data collection. In a preferred embodiment, the image capturing devices 22 are installed vertically with the lens facing directly downwards, but they can also be installed at any tilt angle. Although FIG. 2 shows the setting as a room bound by walls, the system can also be installed in open areas, where the boundaries can be arbitrarily defined by the user depending on the area of coverage of image capturing devices 22. The analytic device 20 does not need to be exposed and can be disposed at any location so long as it is connected to the image capturing devices 22. The analytic device 20 can also be integrated to the image capturing device 22.

In a preferred embodiment, the image capturing devices 22 are powered and connected to the analytic device 20 through PoE (Power over Ethernet) technology. In another embodiment, power supply and connectivity of the image capturing devices 22 is separately provided. The image capturing devices 22 can be connected to the analytic device 20 through wired or wireless means.

Figure 3:
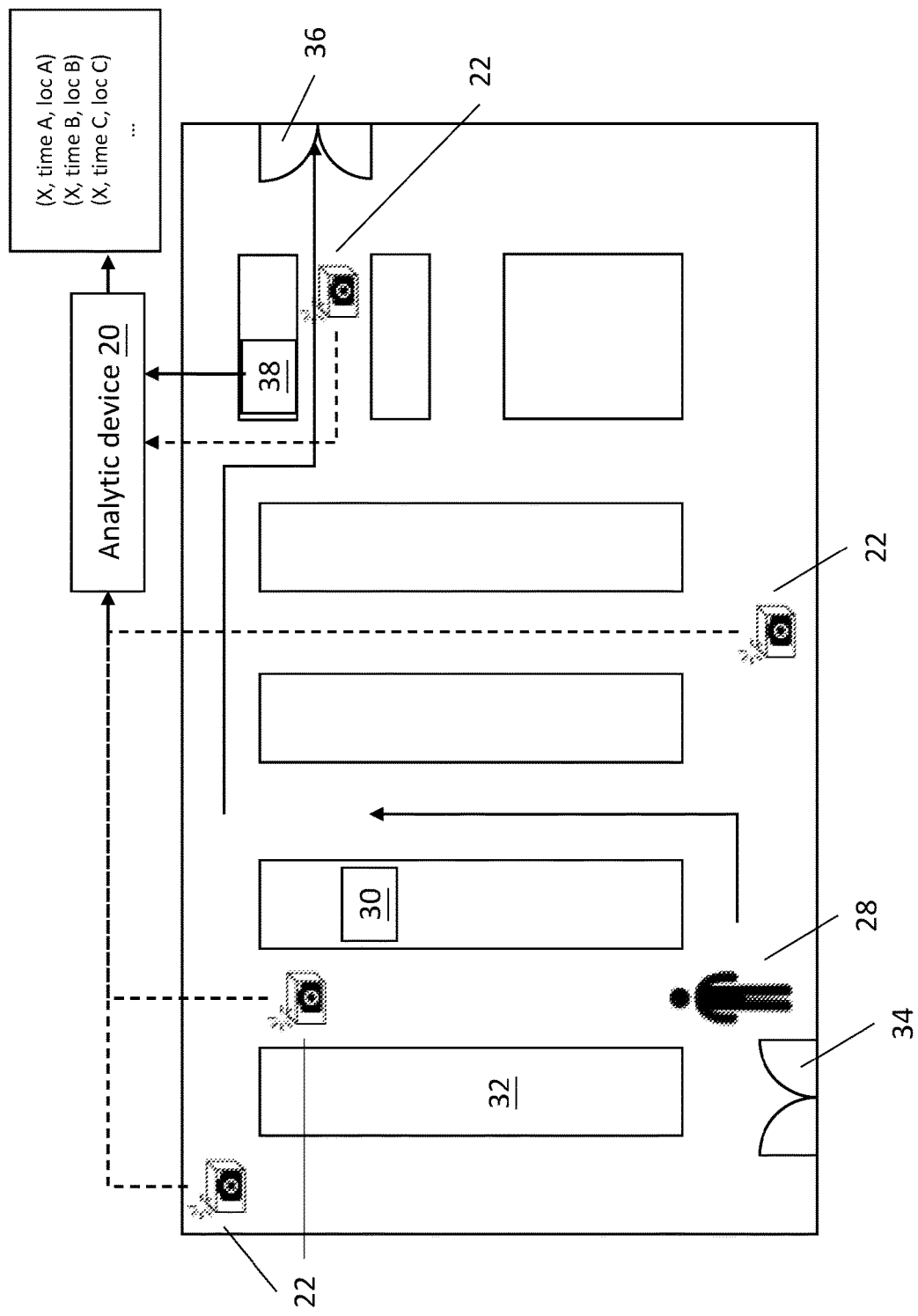
FIG. 3 shows an example flow of how the visual and geolocation tracking system of the present invention tracks a person and an object.

In an example operation as shown in FIG. 3, a person 28 enters the room at an entrance 34, picks up a product item 30 from the product shelf 32, and leaves the room at an exit 36. When the person 28 enters the room, the image capturing devices 22 captures an image including the person 28 and sends to the analytic device 20. The deep learning model 24 of the analytic device 20 analyzes the captured image and determines that the person 28 is a unique object X. The analytic device 20 then tags the person 28 and generates a structured data set for the person 28 including time and location data of the person 28 based on the captured image, and stores the structured data set in the local data storage 26. The location data is determined by mapping the space in the area of detection through calculated placement of the image capturing devices 22, and extracted based on the coordinates of the person 28 in the images captured. The location data can be in two dimensions or three dimensions.

In a preferred embodiment, the deep learning model 24 is trained with image classification using convolutional neural networks. The deep learning model 24 is fine tuned with bounding boxes and image distortions so that it is capable of object detection by recognizing distinct attributes within images, and to tag positional information on the object. The deep learning model 24 is trained to run on low computational memory usage.

While the person 28 moves along the room, the image capturing devices 22 continue to capture images of the person 28. In a preferred embodiment, each image capturing device 22 captures an image at a time interval, such as every six seconds. The time interval can be predetermined or adjusted in real time based on number of targets or size of area covered. Different image capturing devices 22 may have differing time intervals and may not capture image at the exact moments. The analytic device 20, after analyzing the captured images, recognizes the person 28 in the captured images to match the previously identified person 28, and appends the updated time and location data to the existing structured data set. By combining the data analyzed from images captured at different times, a path of movement of the person 28 across time can be tracked and recorded.

When the person 28 arrives at the product shelf 32 and picks up a product item 30, the analytic device 20 is informed of the action based on at least one way. In one embodiment, a weight sensor is disposed at the product shelf 32, such as below the rack of product item 30. When the product item 30 is picked up, the weight sensor detects a change at a sensed location. The change is for example a weight reduction due to the product item 30 being displaced from the sensed location. The weight sensor is linked to the analytic device 20 and this change is sent to the analytic device 20. By determining the location of the weight sensor, the analytic device 20 knows which product item 30 is being picked up. In another embodiment, the analytic device 20 with the deep learning model 24 recognizes a stock keeping unit (SKU) of the product item 30, and the paths of movement of both the person 28 and the product item 30 are tracked and recorded. Both methods can be employed at the same time as each method has its advantages, for example weight sensor is more reliable in a crowded area where image capturing devices 22 may be blocked from taking a clear image of the product item 30, and the SKU includes multiple characteristics of the product item 30, such as brand, size, or packaging features etc. for more advanced analysis. Similarly, other types of sensors can be linked to the analytic device 20 as necessary.

In one embodiment, a transaction device 38 is linked to the analytic device 20. When a transaction is made involving the person 28 or the product item 30, transaction details is sent to the analytic device 20 and integrated to the time and location data of the person 28 or the product item 30. Some example of transaction details can be a method of payment, price, time of transaction, or whether a promotion offer is being utilized.

In one embodiment, the analytic device 20 can be synchronized with other analytic devices 20 to form a distributed edge network. The data can be processed as independent data clusters, and data can be exchanged between different analytic devices 20 to form a more complete data set. In one embodiment, the analytic device 20 is set to connect to an external database at regular time periods to upload the stored data. The uploaded data can be used for further analysis such as product recommendation or targeted advertising.

In one embodiment, the analytic device 20 discards the captured image after the time and location data is analyzed and extracted for protecting privacy and saving storage space.

In one embodiment, the image capturing devices 22 comprises a number of fish eye cameras. A fish eye camera allows a larger area to be scanned with a single device, and while the captured image is distorted to some extent, the deep learning model 24 can compensate the distortion and accurately determine the location of the target. A fish eye camera can be used in open area stores for example where installation points may be limited and a larger area needs to be covered by each image capturing device 22.

In one embodiment, the deep learning model 24 analyzes the captured image for determining demographic information such as age group or sex of the person 28. The demographic information can be used for recommending products to the person 28.

In an example application of the system of the present invention, a shopping mall has a number of shops and an open area outside the shops. Each shop has its own analytic system of the present invention with an analytic device 20 and image capturing devices 22. The shopping mall also installs an analytic system at the open area, and the analytic devices 20 are all connected to each other to form a distributed edge network. The collected data is sent periodically to a management system for statistical analysis for gathering information on customer characteristics, and targeted information can be sent to a user device, for example customized signage directions to a certain shop, or advertisement on promotions or products.

The exemplary embodiments of the present invention are described above. It is to be understood that upon reading the above disclosure, one skilled in the art can change certain details of the present invention without departing from the scope and spirit of the invention, and the scope of protection of the present invention is to be bound by the claims as set forth below.

What is claimed is:

1. A visual and geolocation analytic system including:
an analytic device;

a number of image capturing devices connected to said analytic device;

wherein said image capturing devices capture images of an object at a time interval and send said captured images to said analytic device; said analytic device comprises a deep learning model for analyzing said captured images, allowing said object to be identified and tagged, and allowing a path of movement of said object across time to be tracked;

wherein said deep learning model is trained with image classification using convolutional neural networks and fine tuned with bounding boxes and image distortions, so that it is capable of object detection by recognizing distinct attributes within images and to tag positional information on said object.

2. The visual and geolocation analytic system according to claim 1, wherein said deep learning model of said analytic device comprises an object detection system for recognizing a stock keep- ing unit of a product item.

3. The visual and geolocation analytic system according to claim 1, further comprising a transaction device linked to said analytic device, wherein said transaction device sends a transaction record involving said object to said analytic device, said analytic device integrates said transaction record into said path of movement of said object.

4. The visual and geolocation analytic system according to claim 1, further comprising at least one weight sensor linked to said analytic device, wherein said weight sensor sends a signal to said analytic device when a weight change is detected at a sensed location.

5. The visual and geolocation analytic system according to claim 1, wherein said captured images are discarded from said analytic device after analyzing, and only a structured data set containing an identity and said path of movement of said object across time is retained.

6. The visual and geolocation analytic system according to claim 1, wherein said image capturing devices include fish eye cameras.

7. The visual and geolocation analytic system according to claim 1, wherein said analytic device is synchronized with analytic devices of other systems to form a distributed edge network.

8. The visual and geolocation analytic system according to claim 1, wherein said deep learning model of said analytic device comprises a facial recognition system for recognizing a person.

9. The visual and geolocation analytic system according to claim 8, wherein said facial recognition system further determines demographic information of said person.

10. A method for visual and geolocation analysis, comprising the steps of:

capturing images of an object at a time interval with a number of image capturing devices;

recognizing and tagging said object from said captured images by an analytic device having a deep learning model;

extracting time and location data of said object from said captured images, and tracking a path of movement of said object across time;

wherein said deep learning model is trained with image classification using convolutional neural networks and fine tuned with bounding boxes and image distortions, so that it is capable of object detection by recognizing distinct attributes within images and to tag positional information on said object.

11. The method for visual and geolocation analysis according to claim 10, further comprising the steps of:

receiving a transaction record involving said object from a transaction device; and integrating said transaction record into said path of movement of said object by said analytic device.

12. The method for visual and geolocation analysis according to claim 10, further comprising the step of receiving a signal from a weight sensor when a weight change is detected at a sensed location.

13. The method for visual and geolocation analysis according to claim 10, further comprising the step of discarding said captured images after analyzing.

14. The method for visual and geolocation analysis according to claim 10, further comprising the step of synchronizing with other analytic devices to form a distributed edge network.

15. A visual and geolocation analytic system including:

an analytic device;

a number of image capturing devices connected to said analytic device;

wherein said image capturing devices capture images of an object at a time interval and send said captured images to said analytic device; said analytic device comprises a deep learning model for analyzing said captured images, allowing said object to be identified and tagged, and allowing a path of movement of said object across time to be tracked;

wherein said deep learning model is trained with image classification using convolutional neural networks and fine tuned with bounding boxes and image distortions, so that it is capable of object detection by recognizing distinct attributes within images and to tag positional information on said object;

wherein said captured images are discarded from said analytic device after analyzing, and only a structured data set containing an identity and said path of movement of said object across time is retained.

* * * * *